United States Patent [19]

Polk et al.

[11] Patent Number: 4,926,904
[45] Date of Patent: May 22, 1990

[54] PRESSURE WASHER

[75] Inventors: Gary C. Polk, Eden Prairie; Steve A. Larson, Stacy; Ronald E. Albrecht, Crystal, all of Minn.

[73] Assignee: Power Flo Products Corp., Minneapolis, Minn.

[21] Appl. No.: 364,178

[22] Filed: Jun. 12, 1989

Related U.S. Application Data

[62] Division of Ser. No. 229,832, Aug. 8, 1988, Pat. No. 4,851,724.

[51] Int. Cl.$^5$ ............................................. F04B 21/00
[52] U.S. Cl. .................................. 137/565; 310/68 A; 417/234; 312/351
[58] Field of Search ................... 312/351, 100, 257 R; 310/68 A, 89, 91; 200/293; 417/234; 137/565

[56] References Cited

U.S. PATENT DOCUMENTS

| 4,483,664 | 11/1984 | Armbruster | 417/234 |
| 4,581,991 | 4/1986 | Mooney | 417/234 X |
| 4,715,787 | 12/1987 | Hung | 417/234 X |

Primary Examiner—Alan Cohan
Attorney, Agent, or Firm—Peterson, Wicks, Nemer & Kamrath

[57] ABSTRACT

A housing for a pressure washer for internal components of the washer such as a pump, an electric motor for the pump and a valve assembly. The housing has first and second identical interconnected housing halves. The inner surface of the housing halves include pairs of ribs interacting to engage the internal components.

13 Claims, 2 Drawing Sheets

PRESSURE WASHER

This is a divisional of co-pending application Ser. No. 229,823, filed on Aug. 8, 1988, now U.S. Pat. No. 4,851,724.

BACKGROUND

The present invention relates to apparatus for pressurizing a fluid or liquid such as water, specifically, to a powered system for delivering a fluid or liquid from a supply source and discharging it at a greater pressure, and particularly, to a pressure washer.

Prior to the present invention, pressure washers generally included an induction motor which is continually energized during the entire operation of the pressure washer. Prior pressure washers further included an unloader valve which recirculates water under high pressure in the pump. Delivery of water was controlled by a valve in the water delivery line. Therefore, when the delivery valve was closed, the line pressure would increase opening the unloader valve which would recirculate the water around the pump.

Several disadvantages of prior pressure washers can then be immediately recognized. First, the induction motor, the unloader valve, the delivery valve, and parts required in association therewith are costly. Thus, the major market for prior pressure washers has been for commercial applications as the cost versus benefits has been too large for most consumer applications. Further, oil sump lubrication is utilized in prior pressure washers and which increases the complexity, weight and cost of prior pressure washers.

Additionally, the induction motor is extremely heavy and with the combined weight of the total components limiting portability and making prior washers difficult to transport and utilize. Thus, prior pressure washers have been directed towards commercial applications.

The use of unloader valves is also disadvantageous. Specifically, the recirculated water in the unloader valve becomes very hot especially when the pressure washer is operated for a long period of time without the delivery of water. This heat generation is detrimental to the operation and life of the seals of the pump and of the motor. Further, even when the pressure washer is delivering water, the unloader valve recirculates a small amount of water around the pump to avoid generation of high pressure peaks when the unloader valves unloads. This continual recirculation of water reduces the delivery pressure of the water and results in inefficiencies.

Thus, a need has arisen for innovations allowing the reduction of cost and weight of pressure washers to make such pressure washers particularly adapted for the consumer market.

SUMMARY

The present invention solves this need in the field of pressure washers and other needs and problems in other fields, by providing, in a first aspect, a valve assembly including a piston movable by fluid pressure from a first position preventing fluid flow and into a second position allowing fluid flow, with the piston being biased into its first position such that fluid flow is not permitted until the fluid pressure equals or exceeds the biasing force. The valve assembly further includes a fluid path through the piston to a bypass port and having a member which blocks the fluid path in a first position and which is movable by fluid pressure from its first position to a second position allowing fluid flow, with the blocking member allowing escape of fluid when the fluid is under excessive pressure.

In another aspect of the present invention, a switch housing is provided including a switch box for receiving the switch which controls the electric motor and for receiving the electrical connections between the switch and the motor, with the switch box acting as a platform for and supporting the motor such that the motor closes the interior of the switch box. The switch housing further includes a U-shaped baffle integrally formed with an end of the switch box and having an inner surface for receiving and cradling the electric motor and having an outer surface for receipt in and abutment with the inner surface of the housing.

In still another aspect of the present invention, an improved housing is provided formed from first and second identical housing halves interconnected end for end. The inner surface of the housing halves includes pairs of ribs, with the first of the pair of ribs of the first housing half interacting with the second of the pair of ribs of the second housing half to engage a portion of the housed internal component while the second of the pair of ribs of the first housing half and the first of the pair of ribs of the second housing half not interfering with the housed internal component.

It is thus an object of the present invention to provide a novel pressure washer.

It is further an object of the present invention to provide such a novel pressure washer which is of reduced cost.

It is further an object of the present invention to provide such a novel pressure washer which is of less weight.

It is further an object of the present invention to provide such a novel pressure washer which does not include an unloader valve but stops and starts the pump.

It is further an object of the present invention to provide such a novel pressure washer including a novel valve assembly which prevents weepage of fluid through the pump and which provides over-pressure relief.

It is further an object of the present invention to provide such a novel pressure washer including such a novel valve assembly which also allows weepage through the pump for ease of priming and draining.

It is further an object of the present invention to provide such a novel pressure washer which does not utilize an induction motor but rather utilizes a gear-reduced, high speed universal series motor.

It is further an object of the present invention to provide such a novel pressure washer including a novel switch housing which supports the motor and protects the switch and its connections with the motor from the elements.

It is further an object of the present invention to provide such a novel pressure washer including such a novel switch housing which in combination with ribs formed in the housing forms an air baffle to divide the housing into hot and cold compartments.

It is further an object of the present invention to provide such a novel pressure washer including such a novel switch housing which clamps a pressure line to a nipple of a pressure actuated switch.

It is further an object of the present invention to provide such a novel pressure washer having a housing formed of identical, non mirror image housing halves.

It is further an object of the present invention to provide such a novel pressure washer including such a novel housing where the housing halves are interconnected to each other end for end.

It is further an object of the present invention to provide such a novel pressure washer including such a novel housing having pairs of ribs formed in the inner surface of the housing which engage the internal component in one housing half and which do not interfere with the internal component in the other housing half.

It is further an object of the present invention to provide such a novel pressure washer including such a novel housing utilizing end plates received in apertures terminating in the free edges of the housing halves for providing nonsymetric access to the interior of the housing.

It is further an object of the present invention to provide such a novel pressure washer including such a novel housing utilizing a platform box which supports the internal component and which abuts with ribs formed in the housing halves.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
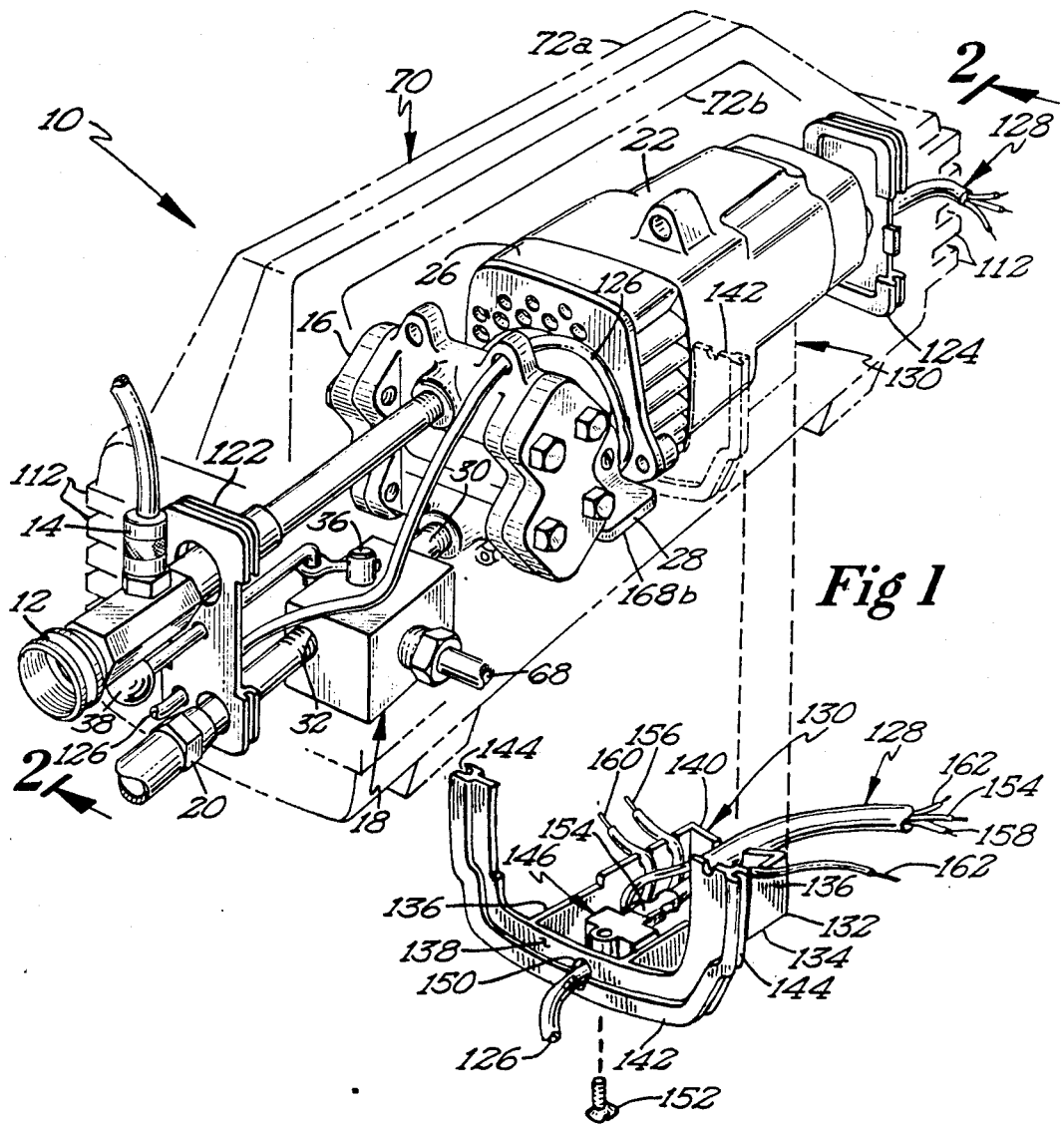
FIG. 1 shows an exploded, perspective view of a pressure washer according to the preferred teachings of the present invention, with portions being removed and with portions shown in phantom.
Figure 3:
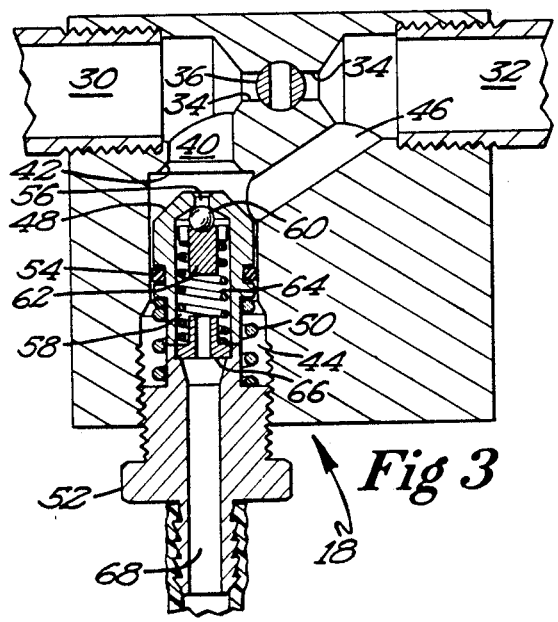
FIG. 3 shows a cross sectional view of the pressure washer of FIG. 1 according to section line 3—3 of FIG. 2.
Figure 4:
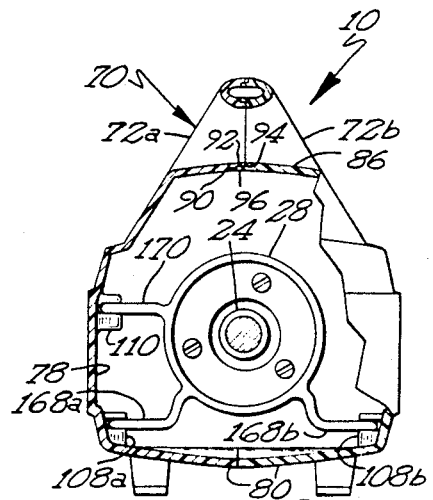
FIG. 4 shows a cross sectional view of the pressure washer of FIG. 1 according to section line 4—4 of FIG. 2.
Figure 2:
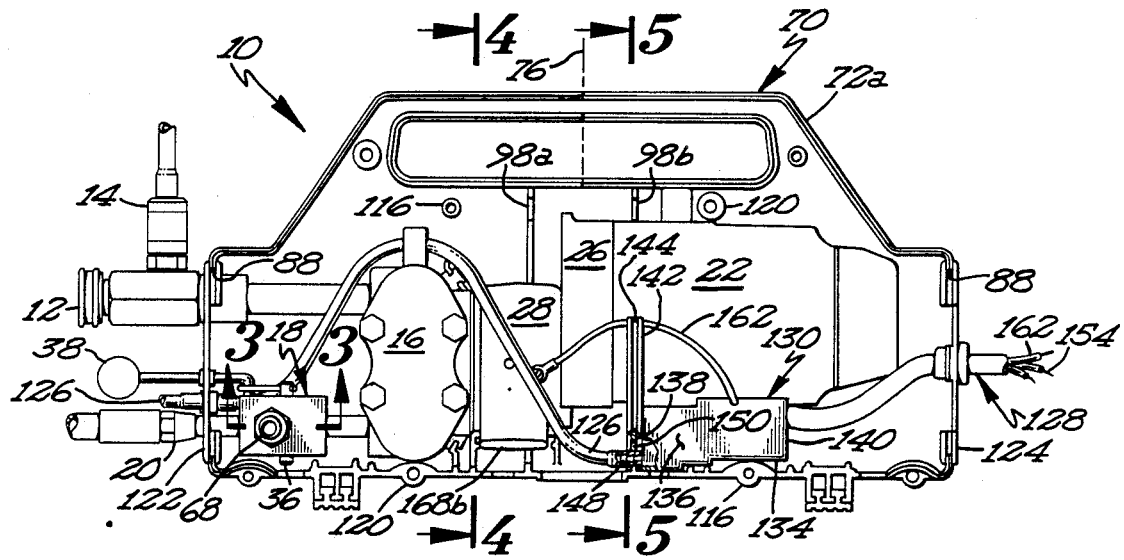
FIG. 2 shows a cross sectional view of the pressure washer of FIG. 1 according to section line 2—2 of FIG. 1.
Figure 5:
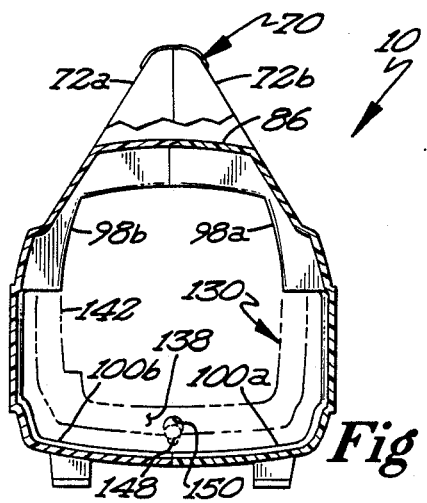
FIG. 5 shows a cross sectional view of the pressure washer of FIG. 1 according to section line 5—5 of FIG. 2.
Figure 6:
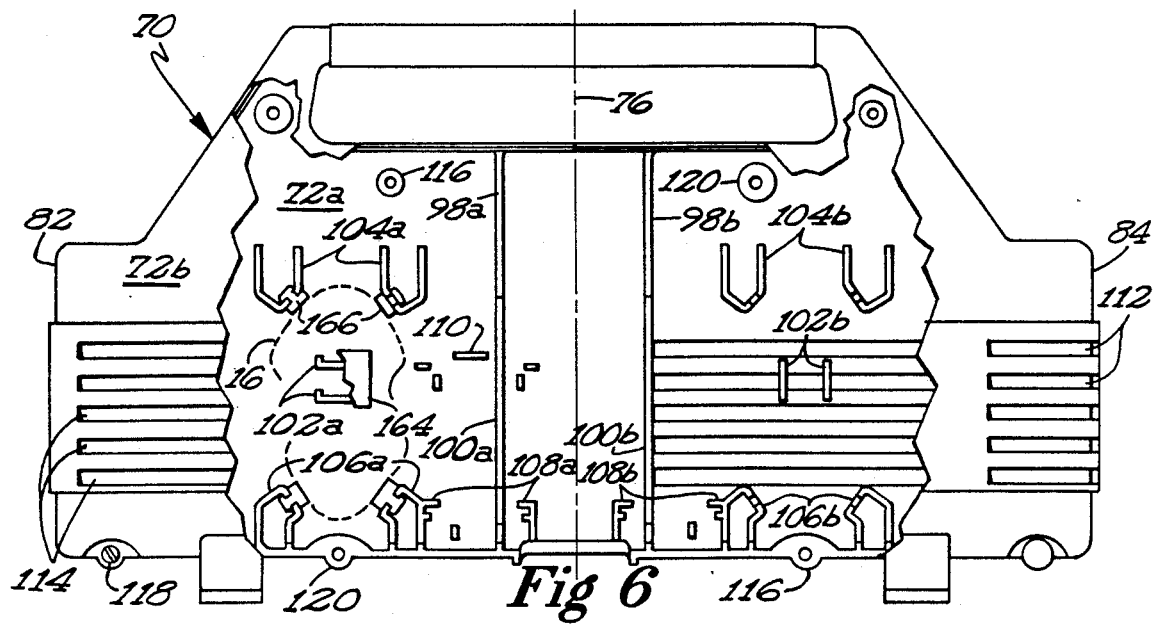
FIG. 6 shows a side view of the pressure washer of FIG. 1 with portions broken away to show the interior and with internal components removed.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "edge", "side", "end", "first", "second", "inside", "inner", "outer", "right", and "left," and similar terms are used herein. it should be understood that these terms have reference only to the structure shown in the drawings as it would appear to a person viewing the drawings and are utilized only to facilitate describing the invention.

DESCRIPTION

Electrical equipment in the form of a pressure washer according to the preferred teachings of the present invention is shown in the drawings and is generally designated 10. Washer 10 generally includes a female connector 12 in fluid communication with a chemical injector 14 in turn in fluid communication with the inlet of a pump 16. The outlet of pump 16 is in fluid communication with a high-pressure block assembly 18 in turn in fluid communication with an outlet connector 20. Connector 20 may be in fluid communication with a water line for delivery to a suitable spray gun such as the type shown and described in U.S. Pat. No. 4,824,340 which is incorporated herein by reference. Connector 12 may be connected to a source of water such as a garden hose attached to a household faucet and may include a strainer. Chemical injector 14 may be of a variety of known forms such as including a venturi which creates a vacuum for drawing fluids such as wax, degreasers, soap and the like from a supply container through a hose.

Pump 16 may be of a variety of known forms and in the most preferred form is a positive displacement pump such as the model 750 pump sold by Power Flo Products Corp. of Minneapolis, Minn. In the preferred form, pump 16 is driven by a motor 22 interconnected by a coupler 24 through a gear box 26 to the drive shaft of pump 16. A mount 28 is provided to physically interconnect pump 16 to gear box 26 in turn physically interconnected to motor 22. Thus mount 28 insures that coupler 24 and the output shaft of gear box 26 and the input shaft of pump 16 are concentric and aligned. Further, mount 28 interconnects pump 16 and motor 22 and gear box 26 as a single unit.

In the preferred form, motor 22 is of the high speed, series, universal variety and gear box 26 has a gear ratio in the range of 4.3 to 1 for decreasing shaft speed. In the most preferred form, motor 22 and gear box 26 is of the identical type utilized in circular saws and in the preferred embodiment, are manufactured and sold by Skil Corporation of Chicago, Ill. and which are utilized in their SKIL® circular saws. In the most preferred form, delivery of pressurized water is controlled by stopping and starting motor 22 which drives pump 16 and specifically an unloader valve which recirculates the water while the pump is continuously driven of prior pressure washers is not utilized in the most preferred form of washer 10 of the present invention.

Assembly 18 in the preferred form performs a multiple of functions and specifically acts as a weepage or non-weepage valve and a pressure relief valve. Specifically, assembly 18 includes an inlet port 30 which is axially aligned with an outlet port 32. Ports 30 and 32 are in fluid communication with each other by a priming port 34 having a priming valve 36 interposed therebetween. Valve 36 in the most preferred form is a spool valve which may be manually rotated by a handle assembly 38 from a first position which allows fluid flow through port 34 from port 30 to port 32 to a second position which prevents fluid flow through port 34 between ports 30 and 32.

An inlet orifice 40 extends generally perpendicularly from port 30 and is in fluid communication with a frustaconical seat 42 of a cylindrical piston chamber 44 also arranged generally perpendicular to port 30. A cross port 46 extends angularly between chamber 44 and port 32. A piston 48 reciprocally received in chamber 44 is biased into sealing engagement with seat 42 by a spring 50 which abuts with a retainer 52 which closes the open end of chamber 44. The biasing force of spring 50 generally only has to exceed the inlet pressure at connector 12 which would be present when pump 16 is not operating, with greater pressures occurring as the result of operation of pump 16 and in the most preferred form, the biasing force of spring 50 is in the range of 100 to 115 psi while common household water pressure is in the range of 10 to 100 psi. In its most preferred form, the ends of spring 50 are recessed from the back of piston 48 and are recessed from the front of retainer 52 such that piston 48 may engage retainer 52 with the recesses in piston 48 and retainer 52 allowing sufficient space for spring 50 to prevent over compression. Suitable provisions 54 for sealing piston 48 with chamber 44 such as an 0-ring as shown may be provided. A relief orifice 56 may be provided in piston 48 in fluid communication with inlet orifice 40 and with a cylindrical chamber 58 formed in piston 48. Orifice 56 is blocked by a ball 60 held by a follower 62 reciprocally received in chamber 58. Follower 62 and ball 60 are biased into a blocking position with orifice 56 by a relief spring 64 abutting with a retainer 66 in turn abutting with retainer 52. A bypass port 68 is formed in retainers 52 and 66 for providing fluid communication between chambers 44 and 58 and the exterior of assembly 18.

Operation of assembly 18 according to the teachings of the present invention may be explained as follows. Fluid from pump 16 enters port 30 then orifice 40 which is sized in relation to piston spring 50 so that piston 48 will prevent flow through orifice 40 until the preload bias of spring 50 is exceeded. Flow is also prevented through orifice 56 until the preload in relief spring 64 is overcome. The preload in piston spring 50 is designed to exceed the water pressure at connector 12, therefore, there will be no flow through pump 16 until pump 16 is turned on. When pump 16 starts, pressure is built up in orifice 40 until the preload in spring 50 is exceeded and piston 16 moves back in chamber 44, opening orifice 40. Flow now passes through the cross port 46 out through the outlet port 32. As pressure continues to rise to the maximum (determined by nozzle size), piston 16 moves back until it comes to rest against the piston retainer 52 and since piston 48 moves back, flow between orifice 40 and cross port 46 is not affected by piston 48. When pump 16 is shut off, the pressure falls until the bias of spring 50 moves piston 48 to close inlet orifice 40 again.

Assembly 18 according to the teachings of the present invention further functions as a relief valve as follows. Ball 60 blocks orifice 56 until the preload bias of spring 64 is exceeded. When an over-pressure occurs such as water pressure exceeding 900 psi, either through a plugged nozzle, a kinked hose or other blockage, the preload bias of spring 64 is exceeded and ball 60 moves off orifice 56 allowing flow through orifice 56 through retainers 52 and 66 and through bypass port 68 thereby relieving any over-pressure.

When air is trapped in the inlet side of pump 16, pump 16 may not be able to overcome the preload bias of piston spring 50. This prevents purging the air from pump 16 and pump 16 cannot pump any fluid. To remove this air, valve 36 may be positioned to allow fluid communication through port 34 between ports 30 and 32. The air will be forced from pump 16 by the fluid pressure at connector 12 or by the pumping action of pump 16. Valve 36 may be left in this fluid communication position until all air is expelled from pump 16, and then may be positioned to prevent fluid communication through port 34 between ports 30 and 32 and the normal operation of high pressure block assembly 18 is resumed.

It can further be appreciated that at times it may be desired for fluid to flow or weep through pump 16 by the fluid pressure at connector 12 and without operation of pump 16. For example, while washing a car it may be desirable to have a slow flow of unpressurized water at all times and have pressurized water available when cleaning certain areas. Specifically, valve 36 may be positioned to allow fluid flow through port 34 between ports 30 and 32 even though fluid pressures necessary to raise piston 48 from seat 42 against the bias of spring 50 does not exist. Thus, to allow weepage through pump 16 at all times, valve 36 may be positioned to allow fluid communication through port 34 bypassing ports 40 and 46. To prevent weepage through pump 16 and allow flow only when pump 16 is operating, valve 36 may be positioned to prevent fluid communication through port 34 and the normal operation of high pressure block assembly 18 occurs. Further, when female connector 12 has been disconnected from the source of fluid, valve 36 may be positioned to allow fluid flow through port 34 between ports 30 and 32 for draining any fluid remaining in washer 10.

Pressure washer 10 according to the preferred teachings of the present invention includes a unique clam shell housing 70. Specifically, housing 70 includes first and second, identically molded, non mirror image halves 72a and 72b which are interconnected together end for end. It can then be appreciated that halves 72a and 72b being identically molded allow savings in capital expenditures and inventory costs as only a single mold and a single part is necessary to create housing 70 as opposed to two separate molds and two parts where the housing is created by two non-identical parts. Although housing formed of identical halves are generally known, the uniqueness of housing 70 of the preferred form of the present invention lies in its ability to house and hold a generally nonsymmetrical internal component such as created by the operating, internal components of washer 10 in the preferred form.

For purposes of explanation, halves 72a and 72b will be described arranged facing the hollow interior and in reference to a plane 76 extending from top to bottom dividing halves 72a and 72b into a right half and a left half of identical length. Specifically, halves 72a and 72b include a side 78 terminating in a bottom 80, a right end wall 82, a left end wall 84, and a top 86 which in the most preferred embodiment forms a handle. End walls 82 and 84 include an opening 88 having identical size and shape and which terminates in the free edges of walls 82 and 84. Bottom 80, walls 82 and 84, and top 86 and their free edges and side 78 are generally reverse mirror images on opposite sides of plane 76.

The free edges of top 86 and at least a portion of bottom 80 to the left of plane 76 and wall 84 on opposite sides of opening 88 may include a perimeter recess 90 which extends one half the way across the free edge from the inside of halves 72a and 72b leaving a perimeter, outer flange 92. The free edges of top 86 and at least a portion of bottom 80 to the right of plane 76 and wall 82 on opposite sides of opening 88 may include a perimeter recess 94 which extends one half the way across the free edge from the outside of halves 72a and 72b leaving a perimeter, inner flange 96. The remaining portions of the free edges of bottom 80 may terminate in a flat surface and may include air cooling and/or access apertures as needed or desired.

Noninterfering air baffle ribs 98a and 98b may be provided extending inwardly from top 86 and partially from side 78 on opposite sides and equidistant plane 76. Noninterfering capture ribs 100a and 100b extend inwardly from the remaining portions of side 78 and bottom 80 opposite sides and equidistant plane 76, with the spacing of ribs 98a and 98b and of ribs 100a and 100b from plane 76 being identical and with ribs 98a and 100a and ribs 98b and 100b being contiguous.

Noninterfering horizontal stop ribs 102a and 102b may be formed on and upstand from side 78 on opposite sides and equidistant plane 76. A pair of noninterfering pump support ribs 104a and 104b may be provided extending inwardly from side 78 and partially from top 86 on opposite sides and equidistant plane 76 and a pair of noninterfering pump support ribs 106a and 106b may be provided extending inwardly from side 78 and partially from bottom 80 on opposite sides and equidistant plane 76. A noninterfering set of mount capture ribs 108a and 108b may be formed on and upstand from side 78 and partially from bottom 80 on opposite sides and equidistant plane 76. A further set of mount capture ribs 110 may be formed on and upstand from side 78 to the left of plane 76 and below air baffle rib 98a.

Other ribs may be provided for strengthening halves 72a and 72b and distributing stresses due to twisting, blows, or the like such as ribs for strengthening the handle to prevent crushing when grasped by the user. louvers 112 formed in side 78 and end 84 to the left of plane 76 and louvers 114 formed in side 78 adjacent end 82 to the right of plane 76. Suitable provisions for attaching halves 72a and 72b together may be provided at various locations such as bosses 116 for threadably receiving screws 118 and corresponding attachment ears 120 may be provided at a corresponding location equidistant and on opposite sides of plane 76.

Halves 72a and 72b may be interconnected end for end with end 82 of half 72a abutting with end 84 of half 72b and with flange 92 received in recess 94 and flange 96 received in recess 90. It can then be appreciated that flanges 92 and 96 and recesses 90 and 94 create an overlap to prevent water from entering housing 70 therethrough and also align halves 72a and 72b together. Screws 118 extending through ears 120 and threadably secured into bosses 116 may then retain halves 72a and 72b in their interconnected and abutting relation. It can then be also appreciated that rib 98a and rib 98b of half 72a abut with rib 98b and rib 98a of half 72b, respectively, to create spaced, parallel U-shaped baffles inside of housing 70. Likewise, rib 100a and rib 100b of half 72a abut with rib 100b and rib 100a of half 72b, respectively, to create a U-shaped capture ridge inside of housing 70. Furthermore, openings 88 of abutting walls 82 and 84 at each end of housing 70 abut together to form a single opening.

Pressure washer 10 according to the teachings of the present invention may further include first and second end plates 122 and 124 having a size and shape for receipt in and closing openings 88 of abutting walls 82 and 84. Suitable provisions for sealing end plates 122 and 124 in walls 82 and 84 may be provided such as providing a longitudinal, perimeter slot in end plates 122 and 124 for sliding receipt on walls 82 and 84. End plate 122 is shown for receipt in openings 88 of wall 84 of half 72a and wall 82 of half 72b and includes suitable provisions for passage of piping from injector 14 to pump 16 and from assembly 18 to connector 20, of handle assembly 38, and of an air line 126. End plate 124 is shown for receipt in openings 88 of wall 82 of half 72a and of wall 84 of half 72b and includes suitable provisions for passage of an electric cord 128. A ground fault circuit interrupter may be integrated into cord 128 for safety reasons.

Washer 10 according to the teachings of the present invention may further include a switch housing 130. In the most preferred form, housing 130 includes a switch box 132 having a closed bottom 134, closed sides 136, closed ends 138 and 140, and an open top. Housing 130 may further include a U-shaped baffle 142 formed integrally with end 138 and which abuts with the U-shaped baffle of abutting ribs 98a and 98b to form an annular baffle. Baffle 142 may be further captured by abutting ribs 100a and 100b such as by providing a perimeter slot 144 formed in baffle 142 for slidable receipt on ribs 100a and 100b.

Washer 10 according to the preferred teachings of the present invention may include a pressure actuated switch 146 having a nipple 148 for connection to air line 126. In its most preferred form, end 138 of switch housing 130 includes a key slot 150 having an enlarged portion of a size larger than the outer diameter of air line 126 on nipple 148 interconnected to a reduced portion of a size generally equal to the outer diameter of air line 126 on nipple 148. Thus, during assembly, air line 126 may be easily passed through the enlarged portion of key slot 150 and connected to nipple 148. Then, air line 126 on nipple 148 may be pushed into the reduced portion of key slot 150 which then acts as a hose clamp for holding air line 126 on nipple 148 and also acts to hold switch 146 inside of switch box 132. A screw 152 extending through bottom 134 may further be provided for holding switch 146 inside box 132 and for holding air line 126 and nipple 148 in the reduced portion of key slot 150.

Switch 146 further includes connections located within switch box 132 to the hot wires 154 and 156 of cord 128 and motor 22, respectively. Connections for the neutral wires 158 and 160 of cord 128 and motor 22, respectively, may be further provided inside switch box 132. Slots may be formed in the free edges of sides 136 allowing passage of wires 156 and 160 of motor 22 and of ground wire 162 of cord 128 from the interior of switch box 132 to its exterior. Similarly, a slot may be formed in baffle 142 adjacent the baffle formed by ribs 98a and 98b for passage of ground wire 162 to allow its connection to mount 28 which is formed of conductive material in its preferred form. It can then be appreciated that switch 146 which actuates motor 22 may be actuated by air pressure communicated by air line 126 from a suitable spray gun including a bellows such as the type shown and described in U.S. Pat. No. 4,824,340.

It can then be appreciated that switch housing 130 acts as a platform for supporting motor 22, with motor 22 resting upon and closing the open top of switch box 132. Thus, switch 146 and the connections of wires 154, 156, 158, and 160 are located within box 132 closed by motor 22 to protect them from the elements. U-shaped baffle 142 engages the outer perimeter and cradles motor 22. Baffle 142 and thus switch housing 130 may be secured in housing 70 by the engagement of slot 144 with abutting ribs 100b and 100a of halves 72a and 72b, respectively, and by the abutment with the abutting ribs 98b and 98a of halves 72a and 72b, respectively. Ribs 98b and 98a of halves 72a and 72b, respectively, engage the outer perimeter and cradle motor 22 and with baffle 142 divides housing 70 into a first, hot compartment and a second, cold compartment and specifically insulates the hot air generated by motor 22 from generally reaching pump 16 and gear box 26. Further, housing 70 separates the water components of washer 10, i.e. pump 16, valve block assembly 18, and the fluid connections, in the cold compartment from the electric components of washer 10, i.e. motor 22, switch 146, electric cord 128, and the electrical connections, in the hot compartment. Additionally, it can be appreciated that switch housing 130 routes and supports wires 156, 158, and 162 by their capture in slots provided in sides 136 and baffle 142 by their abutment with motor 22 and rib 98b, respectively.

Ribs 102a and 102b of halves 72a and 72b, respectively, abut with the sides of pump 16 to prevent horizontal movement of pump 16 and may include suitable rubber bumpers 164 to dampen vibrations. Further, ribs 104a and 106a of half 72a and ribs 104b and 106b of half 72b abut with the angled ends of pump 16 to prevent vertical movement and may include suitable rubber bumpers 166 to dampen vibrations. Mount 28 may generally include legs 168a and 168b extending generally tangentially from the bottom thereof for receipt in ribs 108a and 108b of halves 72a and 72b, respectively, and may include a third leg 170 extending generally parallel to leg 168a and for receipt in rib 110 of half 72a. Thus, mount 28 is further retained and held in housing 70. Further, it can be appreciated that since pump 16, motor 22, and coupler 24 are interconnected together and since housing 70 according to the teachings of the present invention includes provisions for individually retaining each of the components therein, the internal components of housing 70 are firmly retained therein.

It can then be appreciated that rib 98a of half 72a abutting rib 98b of half 72b and rib 100a of half 72a abutting rib 100b of half 72b generally encircle and are spaced from mount 28 in a noninterfering manner and thus function only to strengthen and distribute stresses in housing 70. Similarly, rib 102b of half 72a and rib 102a of half 72b are on opposite sides of and are spaced from motor 22 in a noninterfering manner and thus function only to strengthen and distribute stresses in housing 70. Likewise, ribs 104b and 106b of half 72a and ribs 104a and 106a of half 72b similarly are on opposite sides of and are spaced from motor 22 in a noninterfering manner and thus function only to strengthen and distribute stresses in housing 70. Further, rib 108b of half 72a and ribs 108a and 110 of half 72b are on opposite sides of and are spaced from motor 22 and mount 28 in a noninterfering manner and thus function only to strengthen and distribute stresses in housing 70.

Now that the basic construction and operation of pressure washer 10 of the preferred embodiment has been explained, subtle features and advantages of the present invention can be set forth and appreciated. By stopping and starting electric motor 22 to deliver water, pressure washer 10 according to the teachings of the present invention eliminates the unloader valve of prior pressure washers. Further, permanently lubricated bearings may be substituted for the oil sump lubrication systems of prior pressure washers. Thus, the cost, weight, and the disadvantages thereof including the heat generation problems and system inefficiencies caused by recirculation are eliminated.

Most functions of prior unloader valves are performed by assembly 18 which is particularly advantageous according to the teachings of the present invention. Specifically, assembly 18 stops water flow under the source pressure such as standard household water pressure through pump 16 when it was not operating. Further, assembly 18 also limits water pressure generated by the operation of pump 16 in the event of blockage to prevent the water line connected to connector 20 and to the spray gun from bursting by releasing high pressure water. Additionally, assembly 18 is advantageous due to its low cost, maintenance free, simple construction.

By controlling the operation of motor 22 separate from the water delivery pressure, pressure washer 10 is further advantageous according to the teachings of the present invention. Specifically, the pneumatic control system including air line 126 and switch 146 is separate and apart from the water line allowing the water line to extend without the requirement for on/off valves, connectors and the like generally from assembly 18 to the spray gun with the possible addition of a short section of pulse hose. Further, the spray gun of washer 10 can be inexpensively formed from plastic as the water line may simply pass therethrough without interruption. Therefore, the high cost and weight of connectors, on/off valves and the like are eliminated in pressure washer 10 according to the teachings of the present invention.

Further, washer 10 according to the teachings of the present invention utilizes a high speed (in the range of 15,000 RPM under load and 22,000 RPM unloaded), gear reduced, series universal motor. Such series motors require less copper and other materials than in low speed (1750 RPM) induction motors previously used in pressure washers. Thus, motor 22 according to the teachings of the present invention is less expensive than induction motors and thus reduces the cost of washer 10. Further, motor 22 and gear box 26 according to the teachings of the present invention weigh less than induction motors and thus reduce the weight of washer 10. It can then be appreciated that due to reduction of costs and weight by utilizing motor 22, by eliminating the unloading valves at the pump of prior pressure washers, and by eliminating the high pressure flow control valves previously required in the spray guns of prior pressure washers, pressure washer 10 according to the teachings of the present invention is light weight and economical and especially adapted for the consumer market.

It can further be appreciated that housing 70 of pressure washer 10 is advantageous according to the teachings of the present invention. Specifically, due to the identical construction of halves 72a and 72b, only a single mold is required rather than two separate molds. Thus, the costs and time necessary for tooling is greatly reduced. Further, due to the identical construction of halves 72a and 72b, housing 70 according to the teachings of the present invention has greater uniform appearance from side to side and end to end.

It can then be appreciated that placement of injector 14 between connector 12 and the input of pump 16 is advantageous according to the teachings of the present invention rather than after the output of the pump as in prior pressure washers. With high pressure injectors of prior pressure washers, it is necessary to adjust the nozzle of the spray gun to a low pressure setting to allow for injection and thus reducing the outlet pressure and cleaning power of the pressure washer. The low pressure injector 14 of pressure washer 10 according to the teachings of the present invention does not require reduction of outlet pressure while chemicals are being injected.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Housing for an internal component including a first end having a shape and a second end having a shape, with the shapes of the first and second ends of the internal component being of different sizes and shapes, comprising, in combination: a first housing half having a first end, a second end, and an inner surface defining an interior; a second housing half having a first end, a second end, and an inner surface defining an interior, with the first end of the first housing half being interconnected to the second end of the second housing half and the second end of the first housing half being interconnected to the first end of the second housing half, with the first housing half being identical to the second housing half, with the first and second housing halves each including first and second ribs extending from the inner surface and equidistant and on opposite sides of the center of the housing half between the first and second ends, with the first rib of the first housing half and the second rib of the second housing half engaging the first end of the internal component and the second rib of the first housing half and the first rib of the second housing half being in a noninterfering relation with the second end of the internal component; and third and fourth ribs extending from the inner surface and equidistant and on opposite sides of the center of the housing half between the first and second ends, with the fourth rib of the first housing half and the third rib of the second housing half engaging the second end of the internal component and the third rib of the first housing half and the fourth rib of the second housing half being in a noninterfering relation with the first end of the internal component.

2. The housing of claim 1 wherein the first and second ends of the first and second housing halves terminate in a free edge, wherein the housing further comprises, in combination: at least a first opening formed in and terminating in the free edges of the first end of the first and second housing halves; a first end plate captured in the opening of the first housing half by the second end of the second housing half; and a second end plate captured in the opening of the second housing half by the second end of the first housing half, with the first and second end plates providing nonsymmetric access locations into the interiors of the interconnected housing halves.

3. The housing of claim 1 further comprising, in combination: a platform box for receipt within the inner surfaces of the interconnected housing halves of a size and shape for supporting the first end of the internal component, with the platform box having an end; and a cradle element integrally formed on the end of the platform box for cradling the first end of the internal component, with the first rib of the first housing half and the second rib of the second housing half abutting with the cradle element.

4. The housing of claim 3 further comprising, in combination: means for capturing the cradle element in the first and second housing halves.

5. The housing of claim 4 wherein the cradle element includes an outer surface having a perimeter slot; and wherein the cradle capturing means comprises, in combination: fifth and sixth ribs extending from the inner surface and equidistant and on opposite sides of the center of the housing halves between the first and second ends, with the fifth rib of the first housing half and the sixth rib of the second housing half engaging the perimeter slot of the cradle element and the sixth rib of the first housing half and the fifth rib of the second housing half being in a noninterfering relation with the second end of the internal component.

6. The housing of claim 5 wherein the first end of the internal element includes an electric motor, and wherein the cradle element and the first rib of the first housing half and the second rib of the second housing half divide the housing into a first, hot compartment and a second, cold compartment for insulating the hot air generated by the electric motor in the hot compartment from the cold compartment.

7. The housing of claim 6 wherein the second end of the internal component includes a pump physically interconnected to the electric motor, with the third rib of the second housing half and the fourth rib of the first housing half engaging the pump.

8. The housing of claim 7 wherein the electric motor is controlled by a pressure actuated switch including a nipple attached to a pressure line, with the switch and electrical connections between the switch and electric motor received in the interior of the platform box and being closed therein by the electric motor supported on the platform box; and wherein the platform box further comprises, in combination: a key slot formed in the end of the platform box having an enlarged portion of a size larger than the pressure line attached to the nipple and a reduced portion of a size generally equal to the pressure line attached to the nipple, with the pressure line attached to the nipple movable from the enlarged portion into the reduced portion with the reduced portion clamping the pressure line onto the nipple.

9. The housing of claim 7 wherein the second end of the internal component includes a valve assembly comprising, in combination: an inlet in fluid communication with the pump; an outlet; a piston chamber; means for providing fluid communication between the inlet and the piston chamber; means for providing fluid communication between the piston chamber and the outlet; a piston reciprocally received in the piston chamber and having a first position for blocking fluid communication between the inlet and the outlet and a second position allowing fluid communication between the inlet and the outlet, with fluid passing through the inlet and piston chamber fluid communication providing means moving the piston from its first position to its second position; means for biasing the piston from its second position to its first position; means formed in the piston for providing fluid communication between the inlet and piston chamber fluid communication providing means and a bypass port; means for blocking the bypass port fluid communication providing means in a first position and allowing fluid communication in the bypass port fluid communication providing means in a second position, with fluid passing through the inlet and piston chamber fluid communication providing means moving the blocking means from its first position to its second position; and means for biasing the blocking means from its second position to its first position.

10. The housing of claim 9 wherein the valve assembly further comprises, in combination: means for providing fluid communication between the inlet and the outlet; and valve means movable between a first position allowing fluid communication through the inlet and outlet fluid communication providing means and a second position preventing fluid communication through the inlet and outlet fluid communication providing means.

11. The housing of claim 10 wherein the bypass port fluid communication providing means includes an orifice; and wherein the bypass port blocking means comprises a ball reciprocably received in a chamber formed in the piston.

12. The housing of claim 11 wherein the valve assembly further comprises, in combination: a retainer closing the piston chamber, with the bypass port extending through the retainer; wherein the piston biasing means comprises, in combination: a spring extending between the back of the piston and the retainer; a recess formed in the back of the piston for receiving the spring; and a recess formed in the retainer for receiving the spring, with the depths of the recesses providing sufficient space for the spring when the back of the piston abuts the retainer to prevent over compression of the spring.

13. The housing of claim 12 wherein the blocking means biasing means comprises a spring extending in the chamber formed in the piston between the ball and the retainer.

* * * * *